(12) United States Patent
LaForest (10) Patent No.: US 9,436,514 B2
(45) Date of Patent: *Sep. 6, 2016

(54) AUTOMATIC ADMINISTRATION OF UNIX COMMANDS

(71) Applicant: Oracle International Corporation, Redwood Shores, CA (US)

(72) Inventor: Mark LaForest, Austin, TX (US)

(73) Assignee: Oracle International Corporation, Redwood Shores, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/981,503

(22) Filed: Dec. 28, 2015

(65) Prior Publication Data

US 2016/0132362 A1 May 12, 2016

Related U.S. Application Data

(63) Continuation of application No. 12/393,894, filed on Feb. 26, 2009, now Pat. No. 9,268,608.

(51) Int. Cl.
| | |
|---|---|
| *G06F 15/173* | (2006.01) |
| *G06F 9/50* | (2006.01) |
| *H04L 12/24* | (2006.01) |
| *H04L 29/08* | (2006.01) |

(52) U.S. Cl.
CPC ........... *G06F 9/5083* (2013.01); *G06F 9/5016* (2013.01); *H04L 41/20* (2013.01); *H04L 67/10* (2013.01)

(58) Field of Classification Search
CPC ............. G06F 9/5016; G06F 9/30101; G06F 9/3836; G06F 9/3838; G06F 9/3851; G06F 15/8007; G06Q 10/063; H04L 29/08171; Y10S 707/99945

USPC ........ 709/201, 202, 223, 226, 238; 370/254; 719/313, 314
See application file for complete search history.

(56) References Cited

U.S. PATENT DOCUMENTS

| | | | |
|---|---|---|---|
| 5,297,262 A | 3/1994 | Cox et al. | |
| 5,442,791 A | 8/1995 | Wrabetz et al. | |
| 5,603,063 A * | 2/1997 | Au | G06F 3/0601 710/52 |
| 5,860,143 A | 1/1999 | Plakosh et al. | |

(Continued)

OTHER PUBLICATIONS

Global, v1.03—Ed Finch, Jun. 1999, 12 pages.

(Continued)

*Primary Examiner* — Phuoc Nguyen
*Assistant Examiner* — Davoud Zand
(74) *Attorney, Agent, or Firm* — Kilpatrick Townsend & Stockton LLP (57) ABSTRACT

Various techniques for automatically administering UNIX commands to target systems are disclosed. One method involves receiving information identifying a UNIX command and additional information identifying one or more target systems. The method then issues N instances of the UNIX command in parallel to the one or more target systems, where N is an integer greater than one. The N instances of the UNIX command are issued automatically, in response to receipt of the information and the additional information. In some situations, issuing the N instances of the UNIX command in parallel involves creating N threads, where each of the N threads is configured to issue a respective one of the N instances of the UNIX command to a respective one of the target systems.

20 Claims, 3 Drawing Sheets

(56) References Cited

U.S. PATENT DOCUMENTS

| | | | |
|---|---|---|---|
| 6,782,537 B1 | 8/2004 | Blackmore et al. | |
| 7,428,239 B1 | 9/2008 | Seigneurbieux | |
| 7,529,855 B2* | 5/2009 | Block | H04L 69/16 709/223 |
| 7,627,736 B2 | 12/2009 | Stuttard et al. | |
| 7,739,366 B2 | 6/2010 | Ansari | |
| 7,739,432 B1 | 6/2010 | Shaw et al. | |
| 7,769,803 B2* | 8/2010 | Birdwell | G06F 17/30327 707/713 |
| 8,266,633 B1 | 9/2012 | Saulsbury et al. | |
| 2002/0156917 A1 | 10/2002 | Nye | |
| 2002/0198921 A1 | 12/2002 | Jameson | |
| 2003/0120811 A1 | 6/2003 | Hanson et al. | |
| 2003/0145050 A1 | 7/2003 | Block et al. | |
| 2003/0233571 A1 | 12/2003 | Kraus et al. | |
| 2004/0215398 A1 | 10/2004 | Mixon et al. | |
| 2006/0017969 A1 | 1/2006 | Ly et al. | |
| 2006/0212422 A1 | 9/2006 | Khilani et al. | |
| 2006/0265710 A1 | 11/2006 | Ansari | |
| 2007/0118601 A1* | 5/2007 | Pacheco | H04L 12/5693 709/206 |
| 2007/0130303 A1 | 6/2007 | Anna et al. | |
| 2007/0255829 A1 | 11/2007 | Pecus et al. | |
| 2008/0040564 A1 | 2/2008 | Kubo et al. | |
| 2008/0086541 A1* | 4/2008 | Simpson | H04L 29/08846 709/217 |
| 2008/0235686 A1 | 9/2008 | Brenner | |
| 2009/0019538 A1 | 1/2009 | Pandya | |
| 2009/0055603 A1 | 2/2009 | Holt | |
| 2009/0125907 A1 | 5/2009 | Wen et al. | |
| 2010/0011372 A1 | 1/2010 | Trensch | |
| 2010/0100624 A1 | 4/2010 | Somogyi et al. | |
| 2010/0154042 A1 | 6/2010 | Miyamoto et al. | |
| 2010/0199257 A1* | 8/2010 | Biggerstaff | G06F 8/76 717/104 |
| 2010/0217849 A1 | 8/2010 | LaForest | |
| 2011/0078108 A1 | 3/2011 | Kumar | |
| 2011/0099146 A1 | 4/2011 | McAlister et al. | |
| 2013/0054771 A1 | 2/2013 | Salas et al. | |

OTHER PUBLICATIONS

Global, Internet Archive Wayback Machine, http://web/archive.org/web/20031209063419/http://users.sitestar.netl-efinch/global.html, Jan. 11, 2011, 2 pages.

U.S. Appl. No. 12/393,894, Final Office Action mailed on Apr. 18, 2011, 13 pages.

U.S. Appl. No. 12/393,894, Final Office Action mailed on Aug. 22, 2014, 18 pages.

U.S. Appl. No. 12/393,894, Non-Final Office Action mailed on Dec. 23, 2013, 16 pages.

U.S. Appl. No. 12/393,894, Non-Final Office Action mailed on Oct. 28, 2010, 12 pages.

U.S. Appl. No. 12/393,894, Non-Final Office Action mailed on Mar. 4, 2015, 17 pages.

U.S. Appl. No. 12/393,894, Notice of Allowance mailed on Sep. 25, 2015, 9 pages.

U.S. Appl. No. 13/306,256, Final Office Action mailed on Jan. 15, 2015, 12 pages.

U.S. Appl. No. 13/306,256, Non-Final Office Action mailed on May 14, 2014, 12 pages.

U.S. Appl. No. 13/306,256, Notice of Allowance mailed on Nov. 19, 2015, 10 pages.

* cited by examiner

AUTOMATIC ADMINISTRATION OF UNIX COMMANDS

CROSS REFERENCE TO RELATED APPLICATIONS

This application is a continuation of, and claims the benefit of and priority to U.S. patent application Ser. No. 12/393,894, filed Feb. 26, 2009, now U.S. Pat. No. 9,268,608 entitled "AUTOMATIC ADMINISTRATION OF UNIX COMMANDS," the entire contents of which is incorporated herein by reference.

FIELD OF THE INVENTION

This invention relates to system administration and, more particularly, to performing administrative tasks that involve issuing UNIX commands.

DESCRIPTION OF THE RELATED ART

System administrators are often responsible for issuing UNIX commands to hundreds or even thousands of systems at once. Unfortunately, most of the tools that are currently available to assist with such tasks issue commands serially. As a result, it can take hours or even days for such tools to issue the commands to all of the target systems. Accordingly, new tools that allow system administrators to more quickly issue commands to target systems are desirable.

BRIEF SUMMARY OF THE INVENTION

Various systems and methods for automatically issuing UNIX commands to target systems are disclosed. In one embodiment, a method involves receiving information identifying a UNIX command and additional information identifying one or more target systems. The method then issues N instances of the UNIX command in parallel to the one or more target systems, in response to receiving the information and the additional information. The commands can be issued via a network.

The operations of receiving the information and issuing the N instances of the UNIX command can be performed by a computing device, in response to the computing device executing a compiled application that implements an automatic command administration module. N is an integer greater than one. N can be significantly greater than one in some situations. For example, N can be greater than one hundred or even greater than one thousand.

In some embodiments, issuing the N instances of the UNIX command in parallel involves creating N threads. Each of the N threads is configured to issue a respective one of the N instances of the UNIX command. Before creating the N threads, an amount of available memory can be determined. The amount of available memory can be compared to a required amount of memory needed to create the N threads. Creation of the N threads can be conditioned on whether the amount of available memory exceeds the required amount of memory needed to create the N threads.

The method can additionally involve adding information identifying one of the target systems to an error log, in response to detecting that a corresponding one of the N threads has yet to complete. The detection of whether the corresponding thread has completed can be performed in response to expiration of a delay period, which begins when the N threads are created. Alternatively (or additionally), error information identifying one of the target systems can be logged in response to a thread receiving an error indication from that target system.

In some embodiments, the additional information identifying the target systems is stored in a file. Receiving the additional information can thus involve receiving information, such as a file name, identifying the file and then accessing the file.

The UNIX command can be a multipart command. The information specifying the UNIX command can identify the order of each of several parts of the multipart command. Issuing the N instances of the UNIX command can involve issuing each of the parts of the multipart command in the order identified by the information.

In one embodiment, the method involves creating a queue of target systems. Issuing the N instances of the UNIX command involves issuing an instance of the UNIX command to each of the first N target systems in the queue. The value of N can, in some embodiments, be specified as part of the information.

If the queue contains more than N target systems, the method can also involve issuing the instance of the UNIX command to each of a second N target systems in the queue. The instance of the UNIX command is issued to the first N target systems at a first time, and the instance of the UNIX command is issued to the second N target systems at a second time. The second time is delayed relative to the first time. In some embodiments, the information can indicate the amount of the delay.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention tray be acquired by referring to the following detailed description and the accompanying drawings, listed below, in which like reference numbers indicate like features.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION OF THE INVENTION

Figure 1:
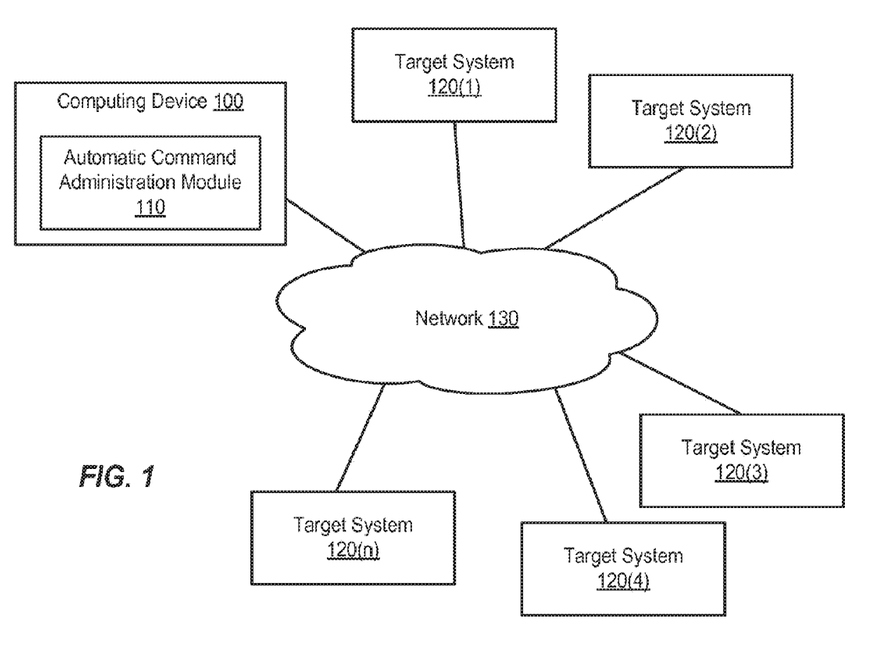
FIG. 1 is a block diagram of a computer system that can remotely administer multiple target systems, according to one embodiment of the present invention.

FIG. 1 is a block diagram of a computer system that can remotely administer multiple target systems. As shown, the system includes a computing device 100 that implements an automatic command administration module 110. Computing device 100 is coupled to target systems 120(1), 120(2), 120(2), 12(3), 12(4), and 12(n) by network 130. In this example, "n" is an integer that is greater than or equal to five (5), indicating that the system can contain five or more target systems. In general, the number of target systems can vary among embodiments. For example, some systems may contain relatively few target systems, while others may include thousands of target systems.

Each target system 120(1)-120(n) is a computing device. Computing devices can include personal computers, network appliances, servers, personal digital assistants, mobile phones, storage controllers, laptop computers, and the like. In many embodiments, most or all of the target system computing devices will be servers (e.g., in a data center or other environment that requires a significant number of servers to operate).

Some target systems can be virtual target systems. These systems behave as if they are independent physical machines and have their own independent identities (e.g., in the form of hostnames, network addresses, and the like). However, these systems may be included in the same physical chassis as one or more other target systems, or even in the same physical chassis as computing device 100.

Automatic command administration module 110 is configured to receive user input specifying a UNIX command, as well as input specifying a set of target systems. Based upon this input, automatic command administration module 110 is configured to automatically, without further user interaction, administer the identified target systems by issuing instances of the UNIX command, in parallel, to at least some of the target systems. Automatic command administration module 110 can continue to issue instances of the UNIX command, in parallel, to target systems until all target systems have been issued an instance of the UNIX command.

As used herein, a UNIX command is any command that is designed to be performed by a UNIX or UNIX-like operating systems. Generally, UNIX operating systems are proprietary operating systems, such as Solaris, Hewlett Packard UniX (HP-UX), and Advanced Interactive eXecutive (AIX), that fully comply with the family of standards known as the Single UNIX Specification (SUS), the core of which is maintained by the Austin Common Standards Revision Group (CSRG). UNIX-like operating systems are typically non-proprietary operating systems such as Linux and BSD (Berkeley Software Distribution, or Berkeley Unix).

Automatic command administration module 110 is implemented as a compiled software application. Since automatic command administration module 110 is already compiled (in contrast with a script), automatic command administration module 110 does not need to be compiled at run time before being used. This in turn reduces the amount of system resources required to operate automatic command administration module 110. Furthermore, as a compiled application (in contrast with a script), automatic command administration module 110 can control the number of instances of the command that are issued in parallel (e.g., by controlling the number of threads and/or forks, as discussed in more detail below), based upon conditions such as current memory usage.

In some embodiments, automatic command administration module 110 is configured to issue the commands to multiple target systems in parallel by creating multiple threads, each of which is configured to issue a command to a respective target system. These threads can be created using a command, such as "pthread_create", that adds a new thread to the current process. When this thread creation technique is used, multiple threads can coexist within the same process. Alternatively, each of the threads can be created by issuing a fork command, which creates a new child process. This technique causes each thread to exist in its own child process. It is noted that in some systems, the operating system may convert thread commands into fork commands.

In some embodiments, automatic command administration module 110 is invoked by a command entered via a command line interface (CLI) of an operating system (alternatively, the automatic command administration module 110 can be invoked via a graphical user interface (GUI), after which a user is prompted for the command to issue, the target systems to which the command should be issued, and other desired parameters). This command can include a command identifier, which identifies automatic command administration module 110 (e.g., by identifying the file name of the executable file that is executed to implement automatic command administration module 110). This command can also take one or more arguments or parameters. Such arguments can include the name of the command to be provided to the target systems, the identities of the target systems (or where to find these identities), the maximum number of commands to issue in parallel, and the like.

Some arguments can be specified using command line switches. Command line switches are special arguments, each of which has an identifier (typically a single letter preceded by a minus sign, such as –f) and, optionally, a user-specified value. Command line switches are typically placed prior to any other arguments. In one embodiment, command line switches are available to specify the maximum number of commands to issue in parallel, the part(s) of the command that is to be issued to the target systems, the delay between issuing successive parts of a command to a target system and/or between issuing commands and then determining whether the issued commands were successful, the name of a file that stores information (e.g., hostnames) identifying the target systems, and whether platform-specific arguments are to be included with the command issued to a given target system. A command line switch (e.g., –h) may also be available to request help (e.g., in the form of a list of the available command line switches for the automatic command administration module and the allowable values that can be provided with each). Sonic command line switches, such as a switch used to specify part of a multipart command, should be accompanied by a value, such as the name of the part of the command. Other command line switches, such as a switch used to request help, should not be accompanied by any values.

In some embodiments, automatic command administration module 110 supports multipart commands. In such embodiments, when a user invokes automatic command administration module 110, the user can specify each part of the multi-part command, as well as the order in which the parts are to be performed. In one embodiment, this is facilitated through the use of numbered command line switches (e.g., numbered 1, 2, 3, . . . , n, where n is the number of parts in the multipart command). For example, to cause automatic command administration module 110 to issue a two-part command, the user can specify "−1 part1 −2 part2". This indicates that command "part1" should be sent to a target system prior to command "part2." As noted above, another command line switch can be used to specify the delay between when a part of a command is issued and when a determination is made as to whether that part of the command was issued successfully. This delay can also set a minimum amount of time that can elapse between when successive parts of a command are issued.

As noted above, instead of being provided to automatic command administration module 110 directly, the identities of the target systems to be administered can be stored in a file, and the name of this file can then be provided to automatic command administration module 110 (e.g., by specifying the filename and/or pathname in an appropriate command line switch). This technique is useful when a large number of (e.g., more than ten) target systems are present. The file can store the identity of each target system, as well as any platform-specific parameters to be included with the command sent to each target system. The parameters, if any, can vary for each identified target system. Thus, the file can specify that Hostname1 is associated with ParameterA, that Hostname2 is associated with ParameterB and ParameterC, that Hostname3 is associated with ParameterA, and so on.

Automatic command administration module 110 can parse this file in order to obtain the identity of each target system to which a command should be issued, as well as to obtain any platform-specific parameters to be provided to each target system. The platform-specific parameters are platform-specific in that these parameters are specific to the operating system of the target system to which the parameters should be sent.

Figure 2:
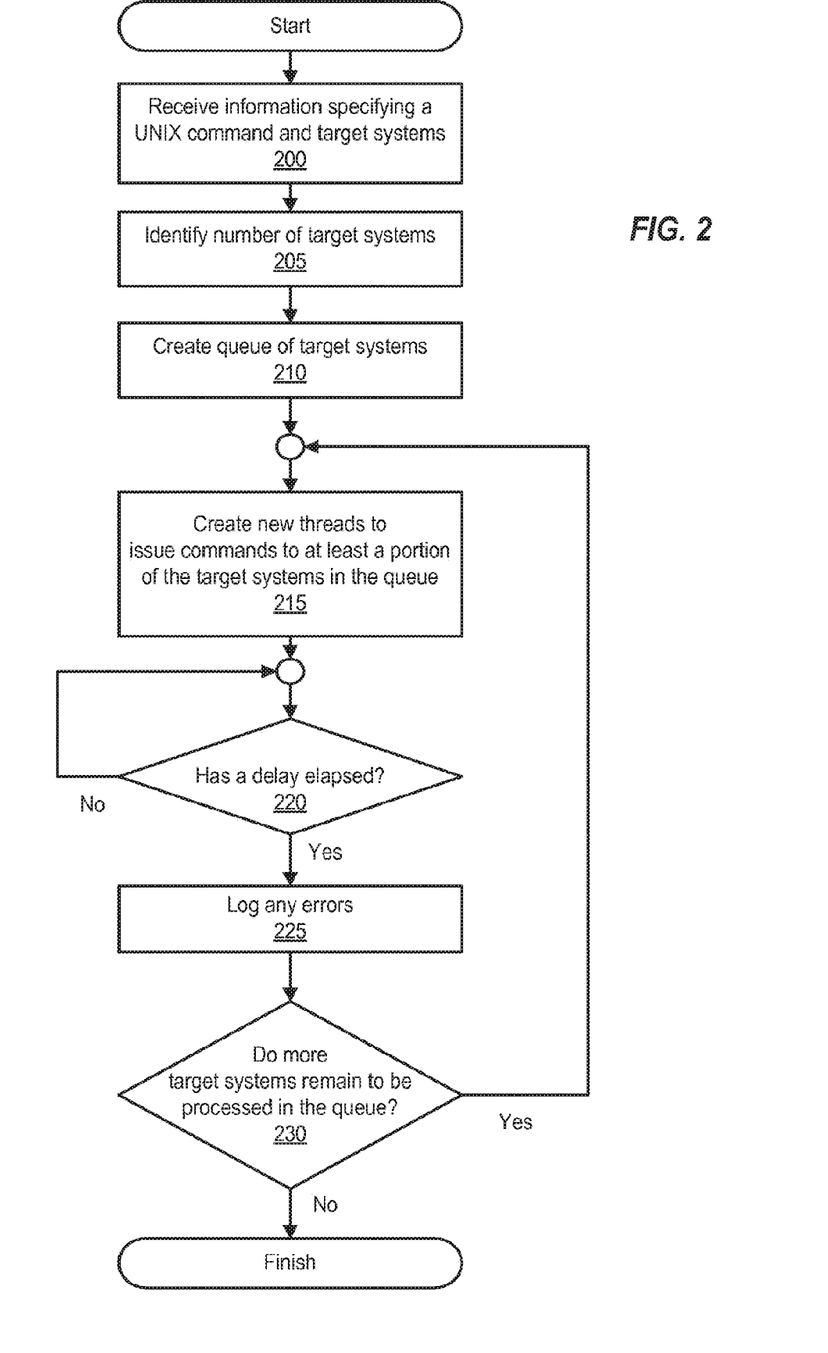
FIG. 2 is a flow chart of one embodiment of a method of remotely administering multiple target systems.

FIG. 2 provides more details regarding how an automatic command administration module, like automatic command administration module 110 of FIG. 1, can issue commands to target systems. Operations 200-230 of FIG. 2 can be performed by an automatic command administration module like that shown in FIG. 1.

The method begins at operation 200, when information specifying a UNIX command and two or more target systems is received. As noted above, this information can be received via a user interface. If the user interface is a CLI, the information can be provided in the form of a command that invokes an automatic command administration module and a list of parameters. The information specifying the UNIX command to issue to the target systems can be provided directly as one of the parameters.

In some situations, the information identifying the target systems can be provided indirectly. For example, a parameter of the command invoking the automatic command administration module can specify a file, which can in turn store the identities of the target systems. Thus, receiving the information identifying the target systems can involve first receiving information identifying a file, and then receiving (e.g., by reading or otherwise accessing) the identified file.

It is noted that additional information can also be received along with the command to be issued to the target systems (e.g., such information can be received as one or more parameters of the command used to invoke the automatic command administration module). Such information can specify the different parts of the command, and the order in which those parts should be issued, if the command is a multipart command. Similarly, such information can include information specifying a delay (e.g., the amount of time to allow to elapse before checking to see if the command was issued successfully and/or the amount of time to allow to elapse between issuing successive parts of a command). Other information can include information indicating whether platform-specific parameters should be issued to the target systems, information identifying the maximum number of commands to be issued in parallel, and the like.

At 205, the number of identified target systems (as identified in the information received at 200) is determined. Determining this number can involve counting the number of target systems specified as parameters of the command, if the target systems are specified directly. If the target systems are specified indirectly, determining this number can involve accessing a file, and then processing that file to determine the number of target systems identified within the file.

Figure 3:
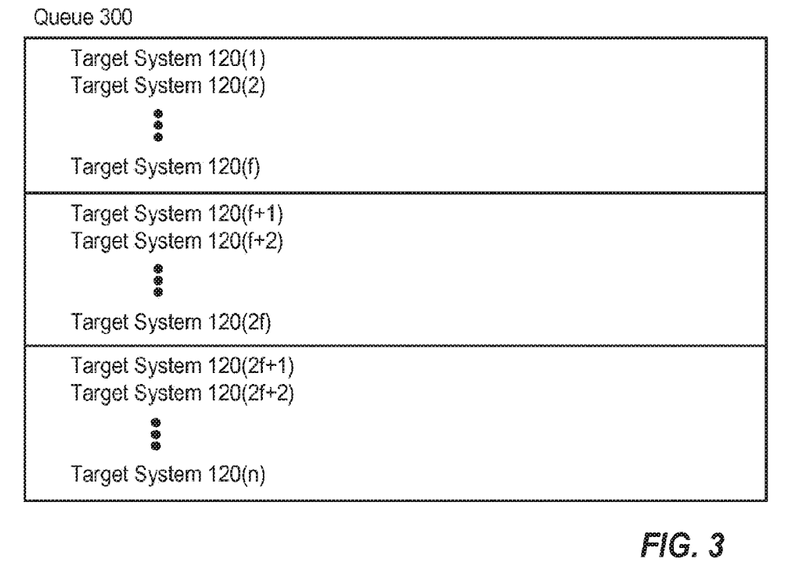
FIG. 3 is an example of a queue that can be generated during the remote administration of multiple target systems, according to one embodiment of the present invention.

At 210, a queue of target systems is created. An example of this queue is shown in FIG. 3. The queue lists all of the target systems identified in the information received at 200. For each target system identified at 200, one entry is created in the queue. This entry identifies the target system, the command to be sent to that target system (including all parts of the command, in order, if the command is a multipart command), and any parameters to be provided to that target system with the command.

It is noted that in some situations, the information received at 200 can specify the same target system multiple times (e.g., in situations in which it is desirable to repeatedly perform the same command on the same target system more than once). Accordingly, when a target system is identified multiple times, multiple entries will be created for that target system within the queue created at 210.

At 215, multiple new threads are created. Each thread corresponds to one entry in the queue. Each thread is configured to send the command specified in the thread's corresponding queue entry to the target system specified in the thread's corresponding queue entry. If the command is a multipart command, the thread is configured to issue the parts of the command to the target system, in the order those parts are listed in the corresponding queue entry (and with an appropriate amount of delay between successively issued command parts, if a delay has been specified). Similarly, if the queue entry indicates that additional parameters should be provided to the target system with a particular command or part of a command, the thread will provide those parameters to the target system. If the target system is located remotely from the system that implements the command administration module (e.g., if the target system is not a virtual system implemented within the same physical chassis as the computing device implementing the automatic command administration module), the thread will issue the command to the target system via a network.

As noted in the description of operation 215 of FIG. 2, the new threads may only be able to issue commands to some (as opposed to all) of the target systems listed in the queue. This situation arises if the number of entries in the queue exceeds the number of threads that the automatic command administration module is allowed to create at any point in time. The number of threads that the automatic command administration module is allowed to create can be determined in a variety of ways, based upon one or more of a variety of different factors.

In one embodiment, before creating new threads, the automatic command administration module is configured to check the amount of memory that is available to the automatic command administration module, and to calculate the amount of memory needed to create a desired number of threads. If the amount of memory is insufficient, the automatic command administration module chooses not to create the new threads at that time. This can lead to the automatic command administration module either returning an error indication to the user that invoked the automatic command administration module or delaying performing of the requested administrative task. Alternatively, the automatic command administration module can determine the number (which is less than the desired number) of new threads to create, based upon the amount of available memory.

As noted above, in some situations, a user may specify the maximum number of threads to create at any given time. In this situation, the desired number of threads is the user-specified number. If no user-specified number is provided (e.g., in situations in which the user failed to provide one, or in systems in which users are not allowed to specify maximum numbers of threads), the automatic command administration module may use a default maximum number that has been preconfigured in the automatic command administration module.

If the number of target systems exceeds the number of threads that can be created at a given time, some target systems will be issued commands later than others. Thus, if there are 10,000 target systems, but only 1,000 threads can be created at the same time, target systems 1-1000 will be issued commands by 1,000 respective threads created during a first period. After those threads finish executing, another 1,000 threads can be created to issue commands to target systems 1001-2000, and so on.

Each time that a new group of threads is created, the automatic command administration module can allow a delay period (e.g., as specified as a default value, or as specified as a parameter provided to the automatic command administration module) to elapse. The delay period begins when the new threads are created. At the end of this period (as determined at 220), the automatic command administration module can check to see whether all of the threads have completed successfully, which in turn indicates that the commands issued by those threads were issued successfully. If any errors have occurred (e.g., if a thread has failed to complete by the time the delay period expires, if the thread received an error indication from the target system), the automatic command administration module can log those errors, as shown at 225. If any threads have failed to complete, the automatic command administration module can also force those threads to cease execution (alternatively, this action can be performed after the entire queue has been processed).

After a particular set of threads has completed execution the automatic command administration module determines whether additional target systems remain to be processed in the queue. If more target systems remain to be processed within the queue, the method returns to operation 215. If all of the target systems have been processed, the method is finished.

FIG. 3 is an example of a queue that can be generated during the remote administration of multiple target systems. As shown, the queue lists n target systems 120(1)-120(n). In this example, the maximum number of threads that can be created at a given point in time is f. As such, the queue has been subdivided into groups of f target systems. The first group includes target systems 120(1)-120(f), the second group includes target systems 120(f+1)-120(2f), and the third group includes target systems 120(2f+1)-120(n) (n may be less than 3f, and thus there may be fewer than f target systems in the final group within the queue).

Each group of target systems within the queue represents a group of target systems that can be administered in parallel by the automatic command administration module. Thus, the automatic command administration module can create a first group of f threads to administer the first group of target systems 120(1)-120(f). After these f threads complete, the automatic command administration module can create a second group of f threads to administer the second group of target systems, and so on.

Figure 4:
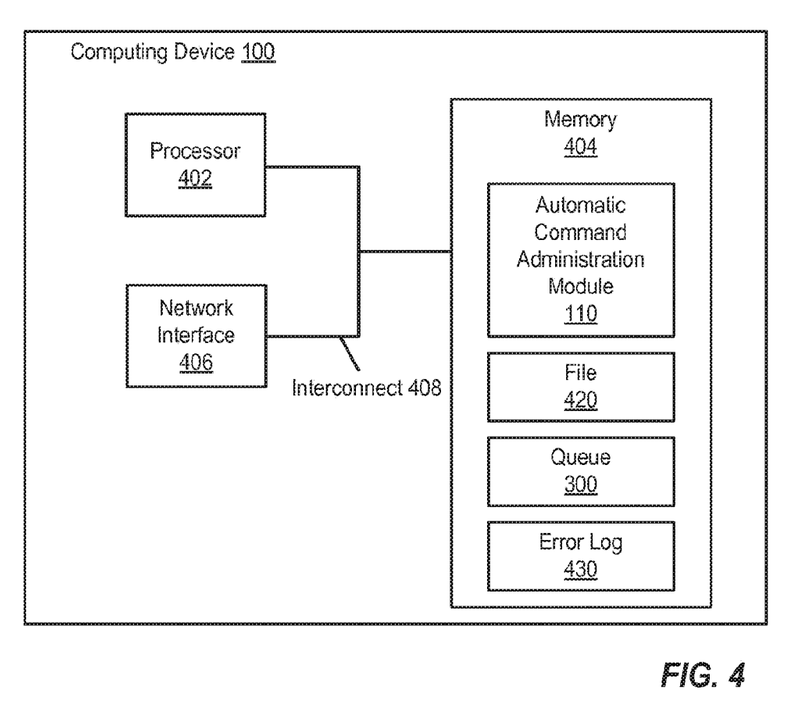
FIG. 4 is a block diagram of a computing device, which illustrates how an automatic command administration module can be implemented in software, according to one embodiment of the present invention.

FIG. 4 is a block diagram of a computing device, which illustrates how an automatic command administration module can be implemented in software. As illustrated, computing device 100 (e.g., as also shown in FIG. 1) includes one or more processors 402 (e.g., microprocessors, programmable logic devices (PLDs), or application specific integrated circuits (ASICs)) configured to execute program instructions stored in memory 404. Memory 404 can include various types of RAM (Random Access Memory), Read Only Memory (ROM), Flash memory, micro electro-mechanical systems (MEMS) memory, magnetic core memory, and the like. Memory 404 can include both volatile and non-volatile memory. Computing device 100 also includes one or more interfaces 406. Processor 402, interface 406, and memory 404 are coupled to send and receive data and control signals by a bus or other interconnect.

Interface 406 can include a network interface to various networks and/or interfaces to various peripheral buses. For example, interface 406 can include a network interface via which a thread created by automatic command administration module 110 can send a command and/or a command parameter to a target system. The thread can also receive responsive indications from the target system (e.g., indicating whether the target system successfully received and/or performed the command sent by the thread). Interface 406 can also include an interface to one or more storage devices (e.g., on which a file, queue, and/or error log are stored).

In this example, program instructions and data executable to implement all or part of automatic command administration module 110 are stored in memory 404. Memory 404 also stores all or part of a file 420, a queue 300 (e.g., as shown in FIG. 3), and an error log 430. Automatic command administration module 110 can access file 420 (e.g., in response to the filename and/or pathname of file 420 being provided as a parameter to command administration module 110) in order to obtain a list of target systems to which commands should be issued. Automatic command administration module 110 can process file 420 to generate queue 300, which can then be processed by threads that are configured to issue commands to target systems. If any errors are detected (e.g., because a thread receives an error indication from a target system, or because a thread fails to complete execution within a delay period), automatic command administration module 110 can write information identifying those errors (e.g., such information can identify a target system from which an error indication was received, a target system that was being administered by a failed thread, a timestamp indicating approximately when the error was detected, the command that was being issued to the target system as part of the administrative action, and the like) to error log 430.

The program instructions and data implementing automatic command administration module 110 can be stored on various computer readable media such as memory 404. In some embodiments, such software is stored on a computer readable medium such as a compact disc (CD), digital versatile disc (DVD), hard disk, optical disk, tape device, floppy disk, and the like). In order to be executed by processor 402, the instructions and data can be loaded into memory 404 from the other computer readable medium. The instructions and/or data can also be transferred to computing device 100 for storage in memory 404 via a network such as the Internet or upon a carrier medium.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. One or more non-transitory computer-readable storage media having collectively stored thereon instructions executable by one or more processors of a computer system, the instructing comprising:

instructions for receiving information that identifies a multipart command configured to be issued to each target of a plurality of target systems, the information further identifying a maximum number of commands to issue in parallel;

instructions for generating a queue that identifies each instance of the multipart command to be issued to each target of the plurality of target systems and that identifies a parameter to be provided with each instance of the multipart command, the parameter comprising platform-specific parameters of each target;

instructions for generating a thread for each target identified in the queue, each thread being configured to issue a respective instance of the multipart command to a respective target identified in the queue; and instructions for issuing, using each respective thread, individual parts of each respective instance of the multipart command to a subset of each target identified in the queue, a number of targets in the subset corresponding to the maximum number identified in the received information.

2. The one or more non-transitory computer-readable storage media of claim 1, wherein the information further identifies an order of the individual parts of each respective instance of the multipart command.

3. The one or more non-transitory computer-readable storage media of claim 2, further comprising instructions for issuing each of the individual parts of each respective instance in the order identified in the received information.

4. The one or more non-transitory computer-readable storage media of claim 1, wherein the information further identifies a delay that sets a minimum amount of time to elapse between issuing the individual parts of each respective instance of the multipart command.

5. The one or more non-transitory computer-readable storage media of claim 4, further comprising instructions for issuing each of the individual parts of each respective instance after the delay.

6. The one or more non-transitory computer-readable storage media of claim 1, wherein the information further identifies additional information about the target systems.

7. The one or more non-transitory computer-readable storage media of claim 6, wherein the additional information is stored in a file, and wherein receiving the information that further identifies the additional information comprises receiving a file name identifying the file.

8. The one or more non-transitory computer-readable storage media of claim 7, further comprising instructions for accessing the file.

9. The one or more non-transitory computer-readable storage media of claim 1, further comprising instructions for:

determining an amount of memory available; and comparing the amount of memory available to a required amount of memory needed to create each thread, wherein generating each thread is performed in response to the amount of memory available exceeding the required amount of memory needed to create each thread.

10. The one or more non-transitory computer-readable storage media of claim 1, further comprising instructions for adding information identifying one target of the plurality of target systems to an error log, in response to detecting that a corresponding thread has yet to complete, wherein the detecting is performed in response to expiration of the delay, and wherein the delay begins when the corresponding thread is created.

11. The one or more non-transitory computer-readable storage media of claim 10, wherein a total number of threads generated exceeds on hundred.

12. The one or more non-transitory computer-readable storage media of claim 1, wherein each instance of the multipart command is issued over a network.

13. The one or more non-transitory computer-readable storage media of claim 1, further comprising instructions for:

receiving an error indication from at least one target of the plurality of target systems; and adding information, to an error log, that identifies the at least one target system.

14. The one or more non-transitory computer-readable storage media of claim 1, wherein issuing each respective instance of the multipart command comprises issuing a first instance of the multipart command to a first target system in the queue.

15. The one or more non-transitory computer-readable storage media of claim 14, further comprising instructions for issuing a second instance of the multipart command to a second target system in the queue.

16. The one or more non-transitory computer-readable storage media of claim 15, wherein the first instance of the multipart command is issued to the first target system at a first time and the second instance of the multipart command is issued to the second target system at a second time.

17. The one or more non-transitory computer-readable storage media of claim 16, wherein the second time is delayed relative to the first time by a delay identified in the information.

18. The one or more non-transitory computer-readable storage media of claim 1, further comprising instructions for subdividing the queue into subsets of the plurality of target systems, wherein the subsets are grouped according to a maximum number of threads that can be created at a time.

19. A computer-implemented method, comprising:

receiving information that identifies a multipart command configured to be issued to each target of a plurality of target systems, the information further identifying a maximum number of commands to issue in parallel;

generating a queue that identifies each instance of the multipart command to be issued to each target of the plurality of target systems and that identifies a parameter to be provided with each instance of the multipart command, the parameter comprising platform-specific parameters of each target;

generating a thread for each target identified in the queue, each thread being configured to issue a respective instance of the multipart command to a respective target identified in the queue; and issuing, using each respective thread, individual parts of each respective instance of the multipart command to a subset of each target identified in the queue, a number of targets in the subset corresponding to the maximum number identified in the received information.

20. A computer system, comprising:
one or more processors; and
memory including instructions that, when executed by the one or more processors, cause the one or more processors to at least:
receive information that identifies a multipart command configured to be issued to each target of a plurality of target systems, the information further identifying a maximum number of commands to issue in parallel;
generate a queue that identifies each instance of the multipart command to be issued to each target of the plurality of target systems and that identifies a parameter to be provided with each instance of the multipart command, the parameter comprising platform-specific parameters of each target;
generate a thread for each target identified in the queue, each thread being configured to issue a respective instance of the multipart command to a respective target identified in the queue; and
issue, using each respective thread, individual parts of each respective instance of the multipart command to a subset of each target identified in the queue, a number of targets in the subset corresponding to the maximum number identified in the received information.

* * * * *

UNITED STATES PATENT AND TRADEMARK OFFICE
CERTIFICATE OF CORRECTION

PATENT NO. : 9,436,514 B2  Page 1 of 1
APPLICATION NO. : 14/981503
DATED : September 6, 2016
INVENTOR(S) : LaForest It is certified that error appears in the above-identified patent and that said Letters Patent is hereby corrected as shown below:

In the Specification

In Column 2, Line 44, delete "tray" and insert -- may --, therefor.

In Column 4, Line 54, delete "Sonic" and insert -- Some --, therefor.

Signed and Sealed this
Thirteenth Day of June, 2017

Joseph Matal
*Performing the Functions and Duties of the*
*Under Secretary of Commerce for Intellectual Property and*
*Director of the United States Patent and Trademark Office*